J. T. CLARK.
TIRE HOLDING MEANS.
APPLICATION FILED FEB. 21, 1918.
1,319,991. Patented Oct. 28, 1919.
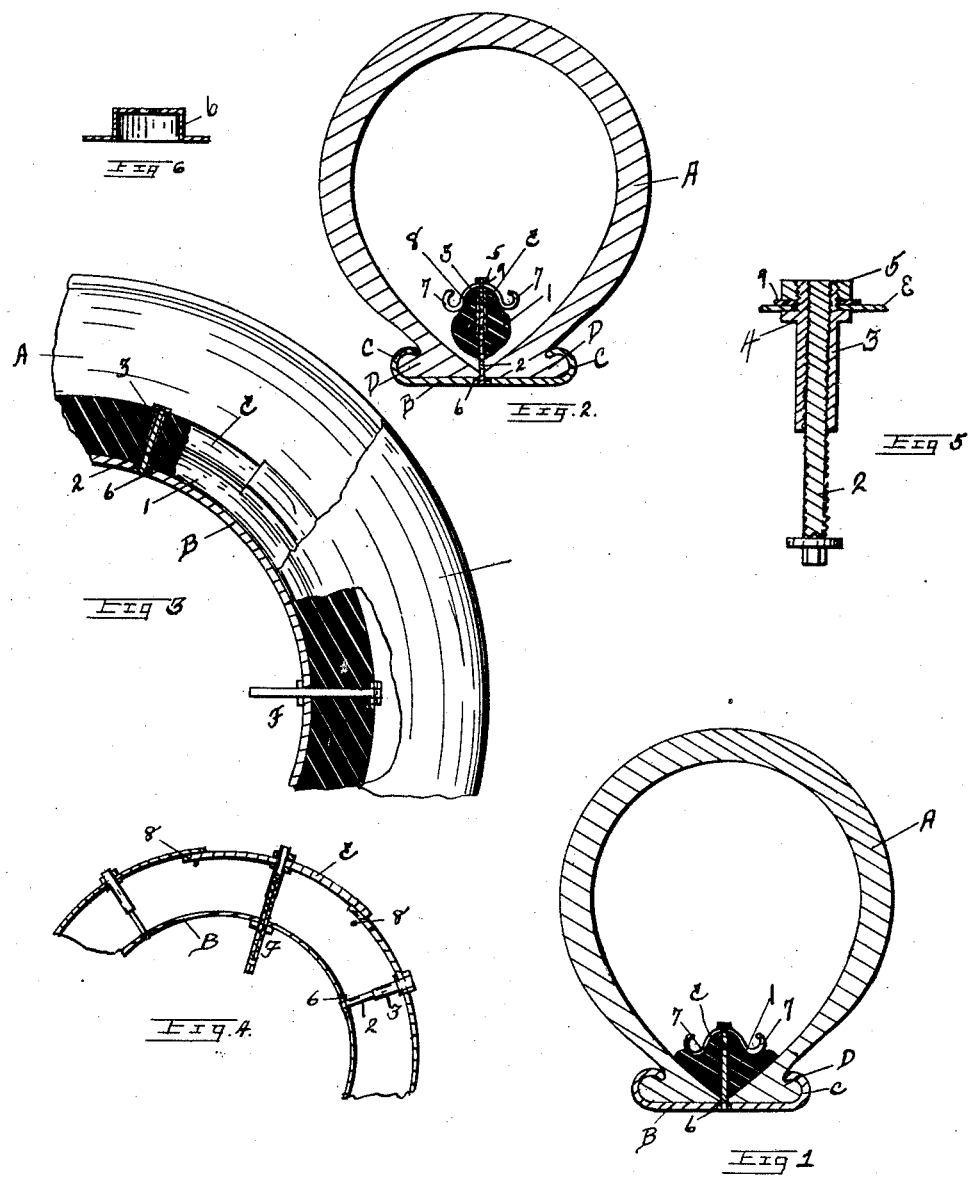

UNITED STATES PATENT OFFICE.

JOHN T. CLARK, OF PROVO, UTAH.

TIRE-HOLDING MEANS.

1,319,991.  Specification of Letters Patent.  Patented Oct. 28, 1919.

Application filed February 21, 1918. Serial No. 218,579.

*To all whom it may concern:*

Be it known that I, JOHN T. CLARK, a citizen of the United States, residing at Provo, in the county of Utah and State of Utah, have invented certain new and useful Improvements in Tire-Holding Means, of which the following is a specification.

My invention relates to vehicle tires and has for its object to provide a device to securely fasten a single tube vehicle tire to a wheel rim and seal said tube so that compressed air may be used to inflate it.

These objects I accomplish with the device illustrated in the accompanying drawings in which similar letters and numerals of reference indicate like parts throughout the several figures and as described in the specification forming a part of this application and pointed out in the appended claims.

In the drawings in which I have shown a substantial embodiment of my invention, Figure 1 is a transverse section of a tire fastened on the wheel rim with my device. Fig. 2 is the same section before the parts has been drawn into sealing position. Fig. 3 is a view showing portions of a vehicle tire in elevation and other portions in longitudinal section fastened on the wheel rim with my device. Fig. 4 is a portion of a longitudinal section of a wheel rim with the metallic parts of my device shown thereon in section. Fig. 5 is a longitudinal section of one of the fastening bolts and nuts, somewhat enlarged from the other views. Fig. 6 is a section of one of the inside washers.

In the use of road vehicles such as automobiles it is highly desirable to use a single tube pneumatic tire and the difficulty has been to fasten such a tire on a wheel rim of the clencher type so that it may be inflated and retained in place while the tire is subjected to all of the rough use such as skidding and fast driving of such vehicles. These difficulties I have overcome in the present invention in which the tire case is shown at A, and the wheel rim at B. The said rim has the usual outwardly curved flanges C, with which the beads D of said casing engage. I provide a soft rubber band 1 which is to be placed within said case A before the same is secured in place on the wheel rim, and inclosing this rubber band 1 as a tire thereon is a plurality of end lapping channel segments E, which are held on and drawn radially inward by bolts 2 and sleeve nuts 3. The said nuts have a flange 4 formed thereon, and a portion is externally threaded to receive a jam nut 5 thereon with a washer 9 thereunder. A square flanged head is provided on said bolts 2 by which the bolts are to be screwed within said sleeve nuts 3. A cup shaped washer 6 is to be used on each of said bolts to allow the head to be set out even with the inner periphery of said wheel rim B and holes are provided in said rim to receive said washers 6. The said segments E each consist of a curved channel or trough like metal piece having outwardly and then inwardly curved edges 7. Transverse rivets 8 are provided which pass through a portion of said rubber band 1 and are headed on the outer side of each of said segments E in order to prevent the sides of said segments from spreading while allowing the overlapping end portions of the adjacent segments E to slide longitudinally when the radially inward tension is applied to said segments by the bolts 2.

In assembling and operating my device the said segments E are secured on said rubber band 1 before it is placed within the case A, by leaving one edge of said case with its bead D not engaged with the flange C. The said edge of said case is then placed in position and the bolts turned by a wrench engaging the square heads of said bolts 2, the washers 6 allowing the wrench to turn, and screwing the bolts within the said sleeve nuts 3. By tightening said bolts the circumference of said segments is reduced and the rubber band is compressed and flattened to the shape shown in Fig. 1, and the edge portions of said case A are rigidly held as a seal for the said casing A. One of said bolts 2 and sleeve nuts 3 is omitted and in its place an air valve F is used. This air valve bolt and nut is similar in all outer essentials to the said bolts 2 while the usual air valves are provided on the interior through which air may be introduced to inflate the case after it has been secured in place on the said rim B.

As the said band 1 is flattened and reduced in circumference the edges are pressed outwardly and held between the curved edges 7 of said segments and the inner face of said casing A, while the inner periphery of said band 1 is forced into the space between the edges of said case and against the peripheric face of said wheel rim B.

Having thus described my invention I desire to secure by Letters Patent and claim:—

1. In a wheel tire the combination with a casing and wheel rim of the clencher type, of a rubber band within said casing; a plurality of over lapping trough like segments secured on and shaped to conform to the peripheric face of said wheel rim; bolts and nuts screwed thereon to draw said segments radially inward and compress said rubber band at the edges of said casing and against said wheel rim.

2. In a vehicle wheel tire the combination with a casing and wheel rim of a rubber band within said casing; a plurality of end lapping troughlike segments fastened on and shaped to conform with the peripheric face of said rubber band; a sleeve nut passed radially through said rubber band and the adjacent segment; a jam nut to fasten said sleeve nut in place; and a bolt whose head is held against the wheel rim adapted to screw in said sleeve to compress said rubber band by drawing said segments radially inward.

In testimony whereof I affix my signature.

JOHN T. CLARK.